May 14, 1968 W. H. STARK 3,383,667

MAGNETIC HEAD SPACING APPARATUS

Filed Jan. 4, 1965

INVENTOR.
WILLIAM H. STARK

BY Joseph A. Speldrich

AGENT

United States Patent Office 3,383,667
Patented May 14, 1968

3,383,667
MAGNETIC HEAD SPACING APPARATUS

William H. Stark, St. Paul, Minn., assignor to Sperry Rand Corporation, New York, N.Y., a corporation of Delaware Filed Jan. 4, 1965, Ser. No. 423,132
5 Claims. (Cl. 340—174.1)

ABSTRACT OF THE DISCLOSURE

A magnetic transducer head structure, including an improved structural assembly, is described. A transducer spacer element is shown for holding the transducer assembly out of contact with the head block mounting slot, and a method of assembly is described.

This invention relates to magnetic heads for use in the recording of reproduction of information from a magnetizable surface such as a record drum, disc, or tape. More particularly the invention is concerned with a method of assembling the heads as well as with a spacer member incorporated in the head structure.

A magnetic head may comprise a series of elongated pole pieces each of which is inserted into a mating slot in a block of non-magnetic material. The pole pieces or cores are arranged in the related mating slots so that one predetermined end of all the poles is exposed, the slots being so arranged that with the pole pieces precisioned therein, the exposed pole piece ends form a line of spaced pole ends. The supporting block also includes a suitable opening to accommodate an associated activating current coil and holder which surrounds each pole piece at some point along the length thereof.

The number of bits of data which may be stored per lineal inch of recording surface is limited, among other factors, by the spacing of the pole pieces of the magnetic head from the recording surface of the magnetic medium. The pole pieces are separated from each other by a short gap and terminate in a common pole face surface having the gap traverse its width. Magnetic flux lines are set up between the pole pieces across the gap, the fringing flux lines encountering the recording surface and magnetizing a predetermined portion thereof. A short gap is necessary to yield high resolution when recording as well as when reading out data.

A magnetizable medium, such as a drum or tape having high remanent magnetic characteristics, is positioned adjacent to a line of exposed core ends and the surface of the drum or tape is displaced laterally to the line of exposed pole ends. As the magnetizable medium moves, the coils of the pole pieces are energized singly and/or in combination as successive positions of the magnetizable medium are presented thereto, the energized coils establishing a magnetic flux in the related core which extends therethrough in a path to the exposed pole end, through the adjacent surface of the magnetizable medium, and back through to the other end of the cores. By this action a pattern of magnetic "spots" forming desired numerals, letters, or characters or the like, are "written" on the tape or drum surface.

The core of the transducer head may consist of a laminated magnetic material or powdered magnetic material, such as ferrite, or a combination of the two, and often is made in two matching haves. Each half is generally C-shaped, with a non-magnetic gap being formed between two confronting legs of the respective halves. The pole faces on opposite sides of the gap are usually tapered toward a front face of the head (that is the face across which the record medium moves) in order to give a high sensitivity. Commonly the gap is formed by inserting between the pole faces a suitable non-magnetic spacer material or shim means. The non-magnetic shim metal is interposed between the pole faces to form a gap in said magnetic circuit. For many applications it is essential that the gap length be small compared with the smallest wave length to be recorded or reproduced.

The transducer heads are manufactured by providing a series of matching parallel slots in the opposed faces of the transducer head, securing the pole pieces in the slots, and finishing the outer adjacent matching pole tips and faces after the blocks are so secured. Multiple head units are thereby produced, with the magnetic gaps arranged in a straight line across the head body, and the tips of the pole pieces in a single plane.

At the present stage of transducer head technology, the transducer support body is machined, etched, or otherwise fabricated to provide slots to accommodate the magnetic cores. These fabrication processes, however, fail to provide a notch having perpendicular surface intersections, leaving a slot having a small radius where the bottom of the slot meets the side wall producing what may be termed for the present purposes a U-shaped slot. Therein accrues the disadvantage which the technique and arrangement of the present invention overcomes. As a result of the current slot finishing operations, additional time is required to apply a finishing operation to the radii formed whereby said radii are reduced to the least value possible. However, the finishing operation fails to remove all of the radii, and, accordingly, the magnetic cores must be chamfered in the amount necessary to permit the cores to seat properly in the slots. To eliminate the radii entirely an uneconomical amount of time is required. Additional production time is required to chamfer the cores. In a multiple channel head, the number of slots and cores to be finished so as to meet rigid specifications becomes extremely significant and unduly burdensome economically. Moreover, the prior art structural features of the slot and cores are such that during alignment of the cores and the gap shim prior to encapsulating operations, wherein an insulating material is formed around the cores for permanent positioning, the cores have a tendency to fracture.

The present invention precludes the necessity for finishing the bottom of the slots to eliminate or minimize the radii resulting from the fabrication process and as well eliminates chamfering of the core sections. To carry out the preceding a core slot spacer element consisting of a rod-like member is inserted so as to be disposed on the bottom of the slot and is of sufficient diameter so as to raise the magnetic core elements out of the area of the radii of curvature of the bottom of the slot and the walls.

The advantages accruing from the core slot spacer element represent a significant decrease in the time and attendant cost for manufacturing and assembling transducer heads. Furthermore, alignment of the core elements of the head in preparation for encapsulating operations is less dangerous from the standpoint of breakage of the core elements.

Accordingly, an object of the present invention is to provide a core slot spacer for a magnetic transducer head.

Another object of the invention is to provide a method of assembling transducer head assemblies.

These and other more detailed objects of the invention will be more evident by referring to the specification and drawings in which.

Figure 1:
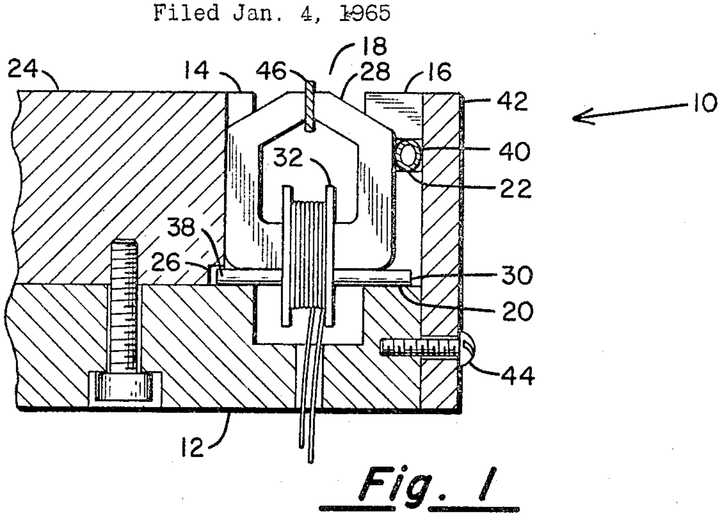
FIG. 1 is an end view of the transducer head incorporating the present invention.

By way of reference to FIG. 1, there is shown a magnetic transducer head 10 comprising a body portion 12 having integral therewith portions 14 and 16. The body portion 12 may be made of non-magnetic or ceramic material. A slot 18 extends the axial length of the head 10 and accommodates a plurality of coils, bobbins, and core elements in the multiple channel transducer head type. The slot 18 is formed by a suitable process, such as by machining, and extends axially of the head between portions 14 and 16. In depth, the slot 18 projects below surface 20 into the head body 12 as will be explained more fully herein. Portion 16 contains a recess 22 the use of which will be described below. A block 24 is secured to the body 12 such as by screws and/or bonding or by other suitable means and contains a notched out area 26 described below in cooperation with the core slot spacer element. Block 24 is described as a separate member only for the reason that under the present fabrication technique involved, core slots in the portions 14 and 16 are machined, and to avoid cutting into the block 24, were it integral with the head body 12, a radius would be cut into the member 24 and its primary function destroyed.

Figure 2:
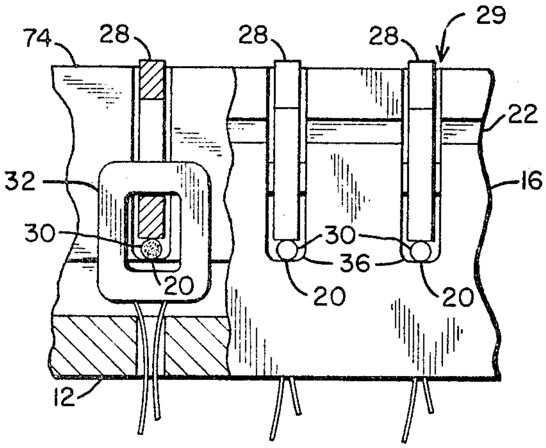
FIG. 2 is a sectional view of the transducer head of FIG. 1.

It is further to be noted that by way of reference to FIG. 2 there are shown a plurality of magnetic core halves 28 disposed in their respective slots 29 in the transducer means. On the bottom surface of each core slot there is a rod-like core slot spacer member 30 constructed of non-magnetic, non-metallic material such as nylon. As may be observed from FIG. 2, the core slot spacers 30 are disposed on surfaces 20 below the magnetic cores and project through the coil bobbins or holders 32. The bobbins project into the bottom of the longitudinal recess 18 extending into the head body. The core slot spacers, as seen in the figures rest on the bottom surface 20 of each slot 29 and maintain the core halves higher in the slots 29 to preclude interference of the core elements with the radii of curvatures 36 at the bottom of the slots 29.

Figure 3:
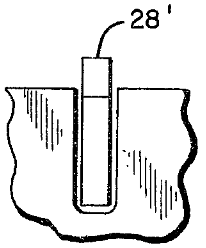
FIG. 3 is a partial view of a transducer head showing a core slot and radii formed by a fabrication process.
Figure 4:
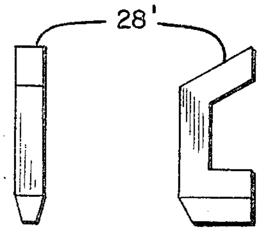
FIG. 4 is a view of a core half chamfered to be accommodated by the slot shown in FIG. 3.

As is evident, the present invention precludes machining operations or other fabrication techniques of the core sections 28' in FIG. 3, to provide the chamfered core section such as shown in FIG. 4. Referring to FIG. 3, the radii remaining at the bottom of the slot do not permit the cores to seat squarely at the bottom thereof. Accordingly, the cores are raised in their respective slots depending upon where on the radius of curvature the bottom edges of the core seats. Furthermore, if machining operations are used to cut the slots, tool wear results in different radii of curvautre from one mating slot to its axially aligned mating slot as well as between successive parallel slots. As a result, the mating pole ends of the cores fail to align properly and as a result thereof operational characteristics of the magnetic head are effected. It is a desired result that all cores provide operational characteristics like another, and of course this is extremely difficult in the arrangement of FIG. 3. Chamfering of the core sections to reduce these variances requires additional fabrication time which is in turn reflected in production costs.

As has been described above, the slot 18 accommodates the coils, bobbins, and core halves. It is to be understood that the above-mentioned arrangement is intended to be illustrative only and not limitative in nature. That is to say, the head body may be spot-faced or countersunk to accommodate a core having the coil wrapped directly around it as an alternative of the arrangement shown in the figures wherein a bobbin supports the coil. The core spacer element may still be utilized therewith and is secured to the bottom of core by the coil itself. The unit is then inserted into the spot-faced or countersunk hole of the head body. It is therefore evident that the axial recess 18 is not the only configuration which will accommodate the head elements. The slots 29, would of course still extend across the spot-faced or countersunk hole just as the slots 29 continue in portions 14 and 16 on either side of the recess 18 of the arrangement illustrated.

The core slot spacer elements of the present invention project into the respective notches or slots 29 such that the spacer elements bear at 20 on the body portion of the head. End portion 38 of the spacers 30 may project into the notched area 26, above mentioned, of the block 24, although said spacers may as well terminate within element or projection 14 without any deleterious consequences. It is to be noted that element 24 is shown as a separate element secured by screws and/or bonding or such like to the body portion 12, in the manner previously explained.

Recess 22, aforementioned, receives tubing 40 or other resilient compressive material which extends the axial length of the transducer head means. Plate member 42 is secured to the body portion 12 such as by screws 44 and/or bonding, for example. The tubing is accordingly wedged into the recess 22 and maintains the core elements in position. In the spot-faced or countersunk configuration, there would likewise by a need to provide the recess 22, the tubing 40, and the plate member 42.

Figure 5:
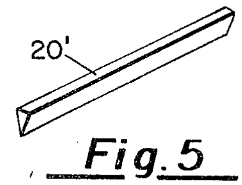
FIG. 5 is a triangular shaped rod-like spacer.

The core slot spacer may also take the form of a triangular rod-like member 20', as shown in FIGURE 5. There is accordingly no intention to limit the spacer to a circular cross section since a variety of configurations may be utilized which come within the scope of the present invention.

To assemble the transducer head, the cores are disposed in the parallel slots 29 with the coils and bobbins projecting into the recess 18 extending longitudinally or axially of the body. As viewed in FIG. 1, the left core half abuts against the block member 24 functioning as a stop means. In accordance with the present invention, the core spacer elements are inserted so as to project through the bobbin aperture and extend below and in contact with the core halves. The spacer elements rest at the bottom of the slots to raise the cores a predetermined distance from the bottom of the individual slots. After all the coils, bobbins and core halves are disposed in their respective positions the tubing means is placed in the longitudinal recess. The plate member is then secured to the body whereby the plate forces the entire length of tubing to abut the right core halves. Accordingly, the shims 46 placed between the core halves are held tightly in place by the force applied by the plate member against the tubing. The head is then ready for the encapsulating operation.

To assemble the spot-faced or countersunk transducer head, the coil wound core with the core slot spacer element is merely dropped into the recesses as a single unit. The core and spacer merely follow the slots with the latter seating at the bottom thereof. The tubing and plate member are then secured as previously described.

It is understood that suitable modifications may be made in the apparatus and method as disclosed provided that such modifications come within the spirit and scope of the appended claims. Having now, therefore, fully illustrated and described my invention, what I claim to be new and desire to protect by Letters Patent is set forth in the appended claims.

What is claimed is:

1. A head assembly means comprising a body portion having predetermined height, length and width dimension only having integral therewith, two upright spaced projections having a predetermined height and extending in a direction parallel to said height dimension of said body portion, said projections containing a plurality of oppositely disposed paired parallel slots, one slot of each pair being located in each of the respective projections, said slots extending along the entire height of said projections, the lower ends of said slots terminated at said body portion, said body portion further containing an axially extending recess along said length dimension and between said upright projections; a plurality of paired core-halves, each half of said paired halves being maintained in an associated one of said oppositely disposed slots, said cores supporting associated bobbins and coils, said bobbins and coils projecting into said axial recess; a plurality of core spacer means, each having first and second ends and disposed at the bottom of an associated one of said oppositely disposed parallel slots, said spacer means extending across axial recess through an aperture of an associated one of said bobbins with said first and second ends resting on said body portion, a portion of the core-halves resting on top of said spacer means thereby spacing said core-halves out of contact with the bottom of the respective slots and said bobbins out of contact with the bottom of said axial recess.

2. The invention defined in claim 1 wherein core-halves disposed in said slots of one of said projections abut the surfaces of said slots, and wherein mating core-halves disposed in said slots of the other of said projection are spaced from a plate means secured to said body portion; said last named projection containing an axial slot opening towards said plate means and extending along said length dimension of said body portion, a flexible means supported within said axial slot, whereby said plate means compresses said flexible means against the last named and associated core-halves thereby maintaining them in a relatively fixed position.

3. The invention defined in claim 2 wherein said body portion further includes a recess portion extending along said length dimension adjacent the bottom of said slots in said one projection, said recess receiving an end portion of said respective spacer means.

4. The head assembly of claim 3 wherein said core spacer means comprises an elongated rod having a circular cross-section and of a length sufficient to span the distance between said recess portion and said other of said projections.

5. A magnetic head assembly comprising: at least one transducer assembly including a pair of core halves, each having first and second ends, a bobbin associated with said first ends, a coil mounted on said bobbin, and shim means positioned between said second ends; body means having predetermined length, height and width dimensions, and including a first slot along said length dimension, the width of said first slot being sufficient for receiving said core-halves of said transducer assembly, said body means further including a second slot in the lower portion of said first slot and along said length dimension of said body means for receiving at least a portion of said bobbin, said second slot having a width dimension smaller than said width of said first slot, the juncture of said first and second slots at the bottom of said first slot forming a pair of parallel shoulders along said length dimension of said body means; spacer means comprising an elongated rod member of a length greater than the width of said second slot and having first and second ends; said rod member positioned through said bobbin and under said pair of core-halves, said first and second ends of said rod member resting on associated ones of said pair of parallel shoulders, said spacer means for holding said core-halves out of contact with the bottom of said first slot and said bobbin out of contact with the bottom of said second slot; and means for holding said transducer assembly in a fixed upright position in said body means.

References Cited

UNITED STATES PATENTS

| | | | |
|---|---|---|---|
| 2,700,588 | 1/1955 | Williams et al. | 340—174.1 |
| 2,769,036 | 10/1956 | Selsted | 179—100.2 |
| 2,785,232 | 3/1957 | Camras | 179—100.2 |
| 2,813,932 | 11/1957 | Kornei | 179—100.2 |
| 2,866,011 | 12/1958 | Kornei | 179—100.2 |
| 2,962,558 | 11/1960 | Hoshino | 179—100.2 |
| 2,998,292 | 8/1961 | Lubkin et al. | 340—174.1 |
| 3,047,674 | 7/1962 | Keskinen | 179—100.2 |
| 3,207,856 | 9/1965 | Page | 179—100.2 |

BERNARD KONICK, *Primary Examiner.*

TERRELL W. FEARS, *Examiner.*

V. P. CANNEY, *Assistant Examiner.*